United States Patent
Szapiel

(10) Patent No.: US 11,982,799 B2
(45) Date of Patent: May 14, 2024

(54) COMPACT ZOOM RELAY SYSTEM AND METHOD WITH VARIFOCAL FREEFORM LENS

(71) Applicant: RAYTHEON CANADA LIMITED, Ottawa (CA)

(72) Inventor: Stan Szapiel, Midland (CA)

(73) Assignee: RAYTHEON CANADA LIMITED, Ottawa (CA)

(*) Notice: Subject to any disclaimer, the term of this patent is extended or adjusted under 35 U.S.C. 154(b) by 57 days.

(21) Appl. No.: 17/851,605

(22) Filed: Jun. 28, 2022

(65) Prior Publication Data
US 2023/0003982 A1 Jan. 5, 2023

Related U.S. Application Data

(60) Provisional application No. 63/217,309, filed on Jul. 1, 2021.

(51) Int. Cl.
*G02B 15/00* (2006.01)
*G02B 13/00* (2006.01)
*G02B 15/14* (2006.01)

(52) U.S. Cl.
CPC ....... *G02B 15/143* (2019.08); *G02B 13/0095* (2013.01); *G02B 15/14* (2013.01)

(58) Field of Classification Search
USPC .................................................. 359/676, 679
See application file for complete search history.

(56) References Cited

U.S. PATENT DOCUMENTS

| | | | | |
|---|---|---|---|---|
| 4,925,281 A | * | 5/1990 | Baker | G02B 7/10 359/708 |
| 6,850,372 B1 | * | 2/2005 | Stenton | G02B 15/00 359/676 |
| 2006/0023316 A1 | * | 2/2006 | Yoshida | G02B 15/04 359/676 |
| 2007/0097508 A1 | | 5/2007 | Ohtake et al. | |

(Continued)

FOREIGN PATENT DOCUMENTS

| | | |
|---|---|---|
| WO | 2014072818 A2 | 5/2014 |
| WO | 2021097548 A1 | 5/2021 |

OTHER PUBLICATIONS

International Search Report and Written Opinion in Application No. PCT/CA2022/051050 dated Sep. 27, 2022 (9 pgs.).

*Primary Examiner* — Darryl J Collins
(74) *Attorney, Agent, or Firm* — NORTON ROSE FULBRIGH CANADA LLP

(57) ABSTRACT

A zoom relay system includes an optical element for receiving light from an object. The zoom relay system is adapted to generate an image of the object on an image plane. The system includes a single varifocal lens group positioned along an optical axis. The varifocal lens group includes at least one lens for providing magnification and a varifocal freeform lens including two lens plates. The lens plates are configured to be disposed along a dimension transverse to the optical axis, such that, when the varifocal lens group is moved along the optical axis to adjust the magnification, the lens plates of the varifocal freeform lens are displaced in the transverse dimension relative to each other to provide compensation, such that, when the magnification is changed, a distance between the object and the image plane remains constant.

12 Claims, 4 Drawing Sheets

(56) References Cited

U.S. PATENT DOCUMENTS

| | | | | |
|---|---|---|---|---|
| 2014/0285905 A1* | 9/2014 | Zhou | ................ | G02B 7/10 |
| | | | | 359/696 |
| 2016/0131900 A1* | 5/2016 | Pretorius | ............ | G02B 13/0095 |
| | | | | 359/368 |

* cited by examiner

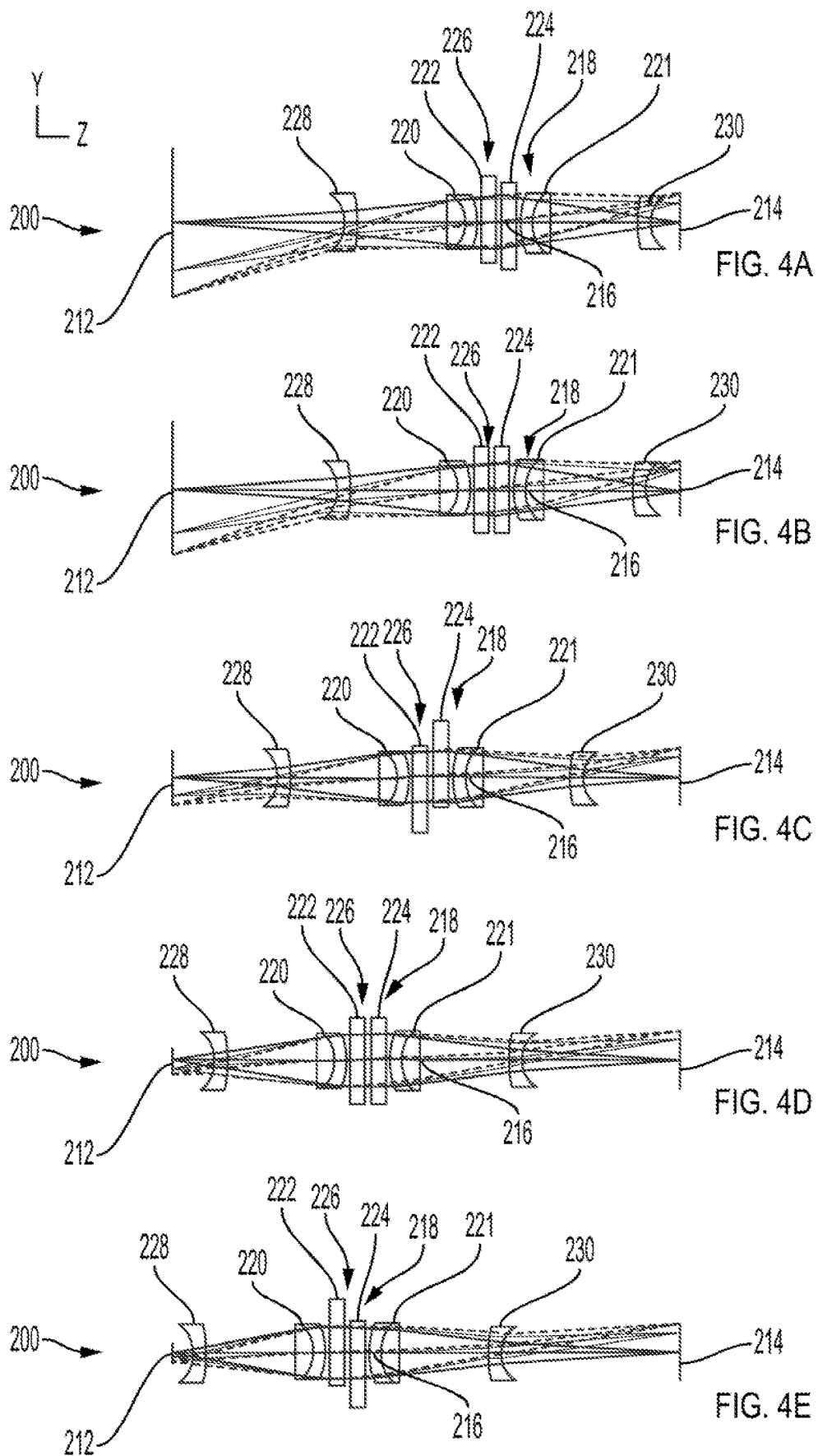

COMPACT ZOOM RELAY SYSTEM AND METHOD WITH VARIFOCAL FREEFORM LENS

CROSS-REFERENCE TO RELATED APPLICATIONS

The present application claims the benefit of provisional application No. 63/217,309, filed Jul. 1, 2021, the entire contents of which is incorporated herein by reference.

BACKGROUND

1. Technical Field

The present disclosure is related to optical systems and, in particular, to a compact zoom relay system and method with a varifocal freeform lens for use in a variety of optical systems.

2. Discussion of Related Art

Optical relays can be used for transferring an image along an optical axis from one location to the other. Both these locations, and the distance between them, are fixed. If a relay has a magnification changer (zoom lens groups, for example), this fixed distance should not change while magnification changes.

Relays are often encountered in a variety of optical systems, like endoscopes, borescopes, vehicle and submarine periscopes, scanners, photocopiers, lithographic projection lenses, advanced photographic lenses, thermal infrared imagers, near-eye wearable head-up displays, spotting telescopes, gun sights, riflescopes, and more.

SUMMARY OF THE TECHNOLOGY

According to one aspect, a zoom relay system is provided. The zoom relay system includes an optical element for receiving light from an object. The zoom relay system is adapted to generate an image of the object on an image plane. The zoom relay system also includes a single varifocal lens group positioned along an optical axis. The varifocal lens group includes at least one lens for providing magnification and a varifocal freeform lens including two lens plates. The lens plates are configured to be disposed along a dimension transverse to the optical axis, such that, when the varifocal lens group is moved along the optical axis to adjust the magnification, the lens plates of the varifocal freeform lens are displaced in the transverse dimension relative to each other to provide compensation, such that, when the magnification is changed, a distance between the object and the image plane remains constant.

In some exemplary embodiments of the system, the at least one lens of the varifocal lens group for providing magnification includes a first lens subgroup comprising at least one lens. In some exemplary embodiments of the system, the first lens subgroup is the optical element for receiving the light from the object.

In other exemplary embodiments of the system, the at least one lens of the varifocal lens group for providing magnification comprises a second lens subgroup comprising at least one lens. In some exemplary embodiments of the system, the varifocal freeform lens is disposed between the first lens subgroup and the second lens subgroup along the optical axis.

In some exemplary embodiments, the system further includes a front lens group disposed along the optical axis between the object and the varifocal lens group. In some exemplary embodiments of the system, the front lens group is the optical element for receiving the light from the object.

In some exemplary embodiments, the system further includes a back lens group disposed along the optical axis between the varifocal lens group and the image plane.

According to another aspect, a method for operating a zoom relay system is provided. The method includes receiving light from an object to an optical element. The method also includes generating an image of the object on an image plane. The method further includes positioning a single varifocal lens group along an optical axis, the varifocal lens group comprising at least one lens for providing magnification and a varifocal freeform lens comprising two lens plates. The lens plates are configured to be disposed along a dimension transverse to the optical axis, such that, when the varifocal lens group is moved along the optical axis to adjust the magnification, the lens plates of the varifocal freeform lens are displaced in the transverse dimension relative to each other to provide compensation, such that, when the magnification is changed, a distance between the object and the image plane remains constant.

In some exemplary embodiments of the method, the at least one lens of the varifocal lens group for providing magnification includes a first lens subgroup comprising at least one lens. In some exemplary embodiments of the method, the first lens subgroup is the optical element for receiving the light from the object.

In other exemplary embodiments of the method, the at least one lens of the varifocal lens group for providing magnification comprises a second lens subgroup comprising at least one lens. In some exemplary embodiments of the method, the varifocal freeform lens is disposed between the first lens subgroup and the second lens subgroup along the optical axis.

In some exemplary embodiments, the method further includes a front lens group disposed along the optical axis between the object and the varifocal lens group. In some exemplary embodiments of the method, the front lens group is the optical element for receiving the light from the object.

In some exemplary embodiments, the method further includes a back lens group disposed along the optical axis between the varifocal lens group and the image plane.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 4A-4E include schematic diagrams of the zoom relay system of FIG. 3 in various operational configurations, according to some exemplary embodiments.

DETAILED DESCRIPTION

According to the present disclosure, a relay optical system is provided with a plurality of movable lenses or lens groups, for example, and is configured to vary magnification, i.e., provide a zoom function, of the entire optical system by relatively moving each lens group and changing a focal length.

According to some embodiments of the present disclosure, in many such applications, especially in compact and portable devices, the relays should be as short as possible. This can be a challenge when a zoom relay is needed, as zoom groups must have large enough room for their axial movements (which are required for changing magnification). The bigger the magnification range, the more room may be needed, and the longer is the relay. For example, in a typical zoom riflescope, the zoom relay significantly contributes to the length of the entire instrument, necessitating innovation as shorter riflescopes are often highly in demand.

It should be noted that it is physically impossible to construct a conventional zoom system by moving a single group of lenses along optical axis. This applies to any type of zoom made of conventional lenses, including zoom relays. Adding a second group of lenses which moves axially at a different rate than the first one solves this problem, but additional room is needed for moving the second group. The present disclosure shows how to use only single axial movement in the zoom relay of the variator group together with a tunable compensator attached to the variator group.

Figure 1:
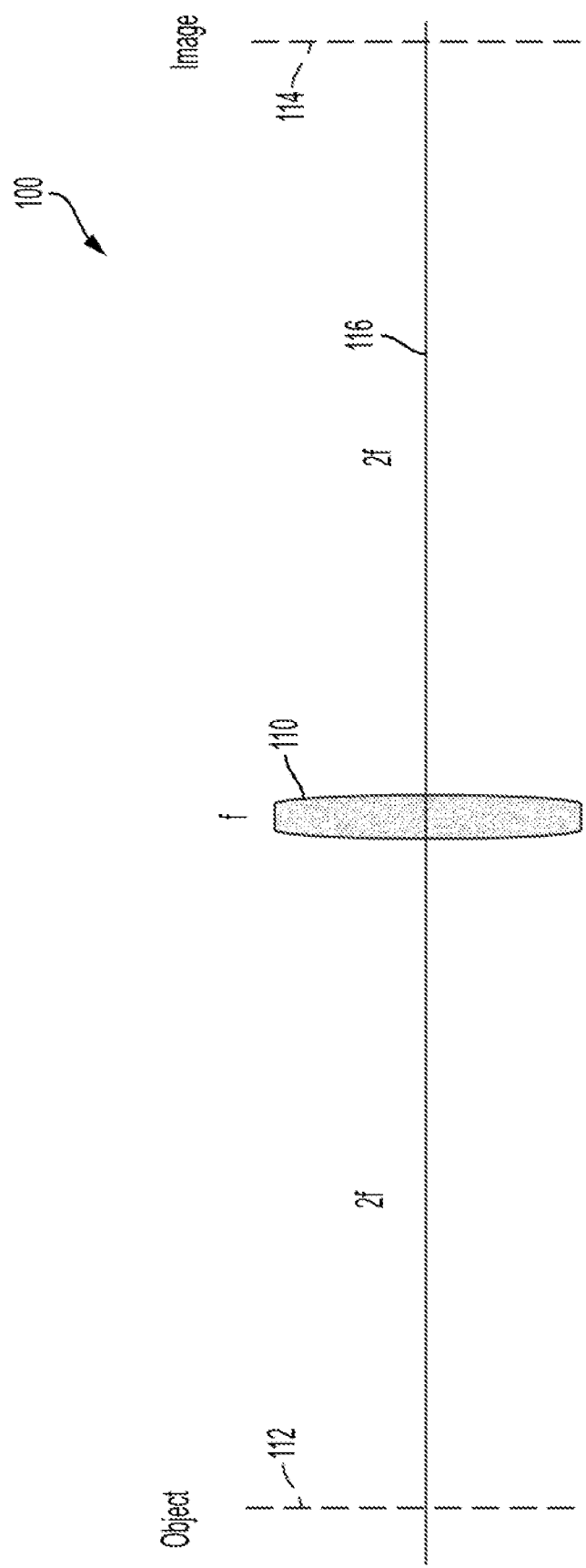
FIG. 1 includes a schematic diagram of a zoom relay system, according to some exemplary embodiments.

FIG. 1 includes a schematic diagram of a zoom relay system 100, according to some exemplary embodiments. Referring to FIG. 1, system 100 includes a single thin lens 110 having a focal length f. Lens 110 forms an image of object 112 at image plane 114. As illustrated in FIG. 1, the shortest possible length of zoom relay system 100 is four times the focal length f of lens 110, i.e., 4f. This shortest length occurs when lens 110 is located at the midpoint along the optical axis 116 of system 100 between object 112 and image plane 114. However, in this particular configuration, transverse magnification is −1, meaning that the image at image plane 114 is the same size as the object, but is inverted.

According to the exemplary embodiments, a zoom relay is provided in which lens 110 can be located anywhere between object 112 and image plane 114, such that the overall magnifications other than −1 are possible, but the shortest distance between object 110 and image plane 114 remains 4f. This is realized by slight adjustment of the refractive power of lens 110 by using a varifocal solid-state compensator attached adjacent to lens 110. In some exemplary embodiments, the compensator is a fairly weak Alvarez-Lohmann (AL) lens (i.e. absolute value of its refractive power can be small), of the type described in U.S. Pat. No. 3,305,294 (the '294 patent).

The '294 patent provides a two-element, variable-power, i.e., varifocal lens, which can be and has been successfully designed and constructed for substantial variations in power with small movements of the lens elements relative to their size, and which is substantially free of distortion over the whole field of view. This result is obtained by forming the lens elements substantially in accordance with a thickness equation herein disclosed.

In brief, the variable-power lens includes two plano-freeform lens elements arranged in tandem, one behind the other along the optical axis of the lens system, the optical axis being substantially normal to the element surfaces and passing substantially through their centers. At least one of these lens elements is movable in a direction transverse to the optical axis, and preferably both lens elements are moved by equal amounts in opposite directions along the same transverse axis. In order to precisely define the lens parameters it is convenient to employ a rectangular coordinate system of mutually perpendicular axes x, y and z. The optical axis of the lens system is taken to be the z axis and the freeform sag profile Z(x,y) is measured parallel to this axis in the following notations.

Figure 2:
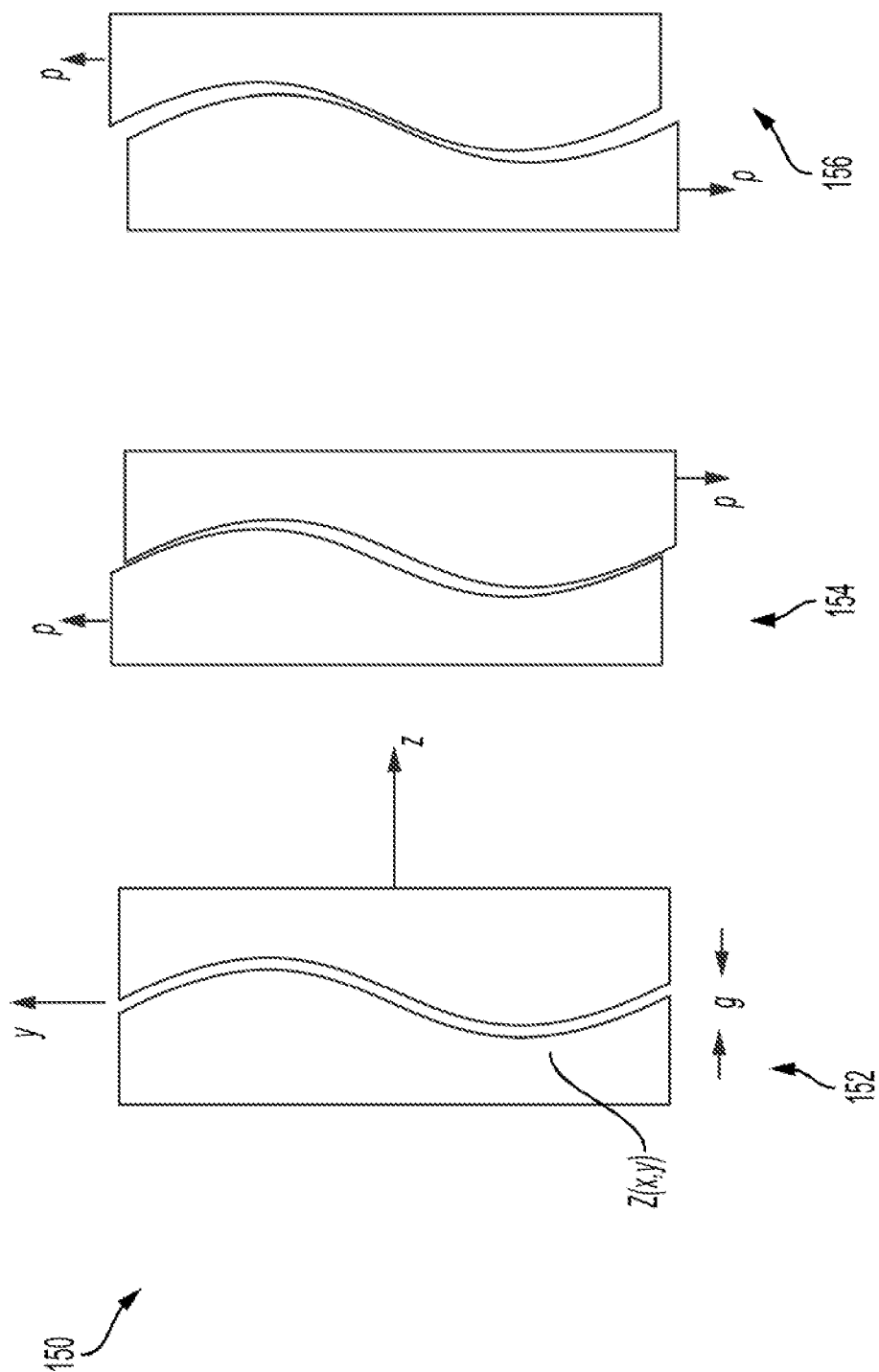
FIG. 2 includes a cross-section view of the principle of a varifocal AL doublet.

FIG. 2 shows a refractive free-form AL-type doublet view 150 (AL sandwich) with a general freeform surface profile Z(x,y) and a very small axial air gap, g. According to the exemplary embodiments, view 150 includes zero refractive power doublet view 152, (afocal state, i.e., focal length is infinite), negative power doublet view 154, and positive power doublet view 156. For each, both plano-freeform elements of the doublet can have in fact the same freeform profile, except that the second element is inverted with respect to the first one. According to the exemplary embodiments, if both elements are laterally aligned with respect to the optical axis, the action of AL doublet can essentially be the same as that of a plane-parallel plate (provided that the air gap g is very small). According to some embodiments, assume that one element of the doublet can be slightly displaced vertically with respect to the other one so the total vertical shift is symmetrical about optical axis and equals 2p. If the refractive index of each doublet element is n, and the vertical shift is sufficiently small, the flat incoming wavefront propagating along optical axis will be transformed by the doublet into:

$$W(x,y)=2p(n-1)Z'(x,y)$$

where W(x,y) stands for the transformed wavefront emerging from the doublet, and Z' denotes first derivative of the freeform sag profile Z taken over direction of vertical shift, y. Therefore, if the present disclosure integrates over y a required wavefront shape W(x,y), a corresponding surface profile Z can be found, which will generate this wavefront.

In particular, one can require that a planar incoming flat wavefront is transformed by AL doublet into a spherical one. In paraxial approximation, the requested emerging spherical wavefront can be then expressed as:

$$W(x,y) \sim D(x^2+y^2)$$

where $D=1/(2R)$ and R is radius of curvature of the requested spherical wavefront. According to the exemplary embodiments herein, the sign of R can determine if the emerging wavefront is convergent or divergent. Integrating this wavefront over y gives:

$$Z(x, y) \propto x^2 y + \frac{y^3}{3}$$

which describes the cubic type freeform profile originally derived by Alvarez. It should be noted that the freeform profile is bilaterally symmetric with respect to the vertical axis, y. After following elementary derivations shown in the '294 patent, the refractive power of the original AL doublet can be finally expressed as:

$$K = \frac{1}{EFL} = \frac{4(n-1)Ap}{L^{\wedge}3}$$

where EFL stands for effective focal length, A is amplitude of the cubic sag and L is proper normalization dimension of clear aperture of the cubic surface (i.e., normalization semi-diameter for circular clear aperture, or normalization semi-height of square or rectangular clear aperture). According to the exemplary embodiments of the present disclosure, it is clear from the above equation that the refractive power of the AL doublet tunes from the afocal state (p=0) to either positive or negative refractive power, depending on the sign and the amount of the vertical shift, p.

In deriving the lens equations set forth herein, the usual paraxial approximations that are valid for thin lenses were made. Specifically, it was assumed that the transverse displacement of a light ray as it passes through the lens is negligible; that the sines of all deflection angles are numerically equal to the angles themselves, measured in radians; and that the deflection angle is independent of the slope of a lens element with respect to the incoming or outgoing light rays.

However, this disclosure is not limited to such thin lenses; it may also be used in relatively thick lens systems, such as fast camera lenses, and in other cases where the thin lens assumptions are not valid. In such cases, the basic lens equations hereinbefore set forth may be used to obtain a first tentative design. Then, the aberrations of the lens may be investigated, using graphical ray-tracing and other advanced computer-aided design techniques known to those skilled in the art, to revise the lens design for minimizing the aberrations.

Figure 3:
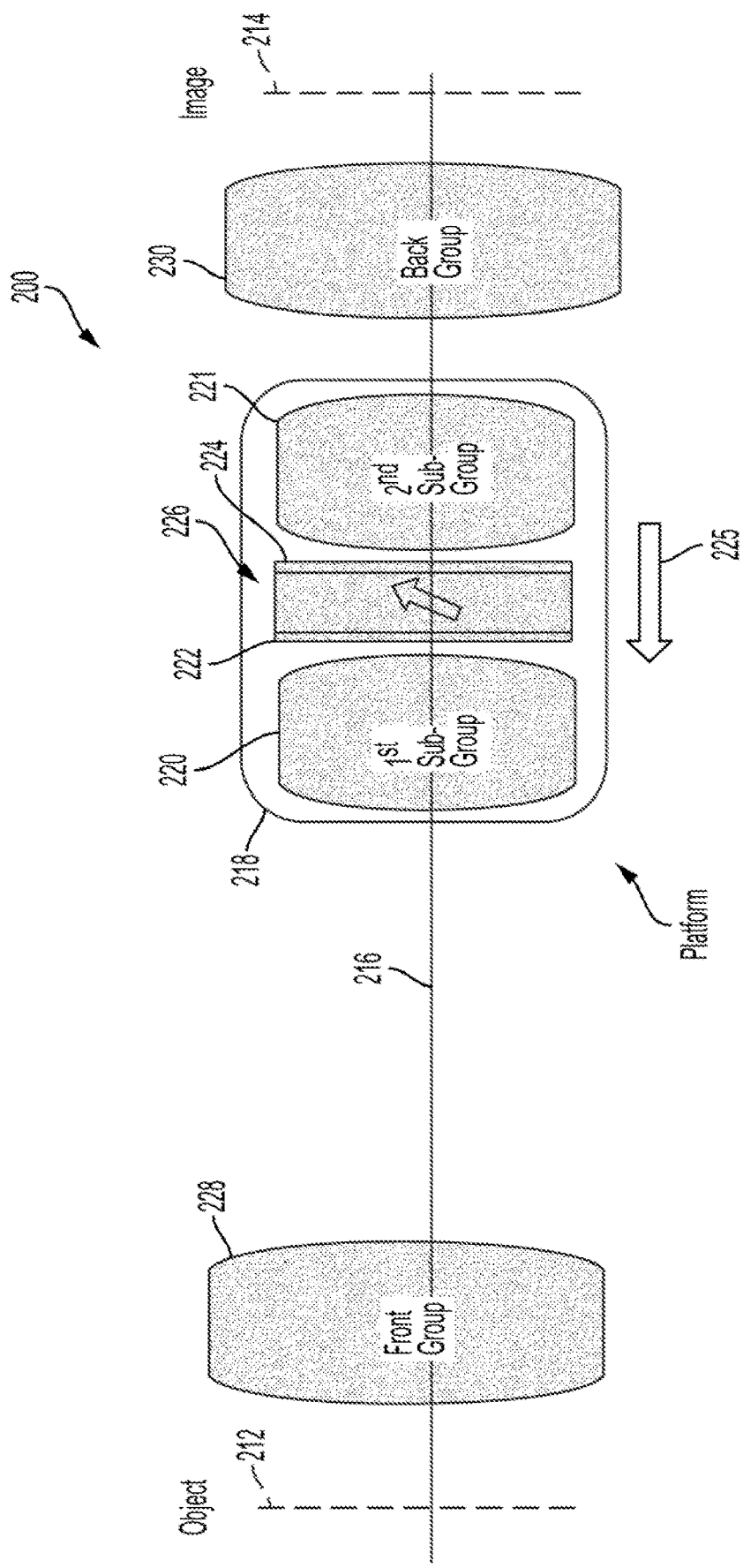
FIG. 3 includes a schematic diagram of a zoom relay system, including a varifocal lens, according to some exemplary embodiments.

FIG. 3 includes a schematic diagram of a zoom relay system 200, including a varifocal freeform lens, according to some exemplary embodiments. Referring to FIG. 3, zoom relay system 200 forms an image of object 212 at image plane 214. System 200 includes a single varifocal lens group 218 mounted on a movable platform. The varifocal lens group 218 can include a first subgroup 220 of one or more lenses, a second subgroup 221 of one or more lenses, and a weak A-L varifocal freeform lens 226, which in some embodiments is a tunable solid-state freeform lens, mounted between the first and second subgroups. Single varifocal lens group 218 is moveable via its platform along optical axis 216, as indicated by arrow 225, to vary magnification and thus provide the zoom capability. Varifocal freeform lens 226 includes lens plates 222 and 224 which are moveable in a dimension transverse to optical axis 116, as described above in detail, to vary focus of the varifocal lens group 218.

According to the present disclosure, when varifocal lens group 218 is moved axially, i.e., along optical axis 216, first subgroup 220 and second subgroup 221 act to provide the desired magnification, i.e., zoom. At the same time, according to the exemplary embodiments, plates 222 and 224 of varifocal freeform lens 226 are moved relative to each other in the dimension transverse to optical axis 216 to compensate for movement of the image from image plane 214, such that the image does not move from image plane 214. Hence, according to the exemplary embodiments, the relay length does not change while magnification changes.

System 200 can optionally also include one or more additional lens groups, each including one or more lenses. For example, system 200 can include a front lens group 228 and a back lens group 230 disposed on opposite sides of varifocal lens group 218 along optical axis 216. Front lens group 228 and back lens group 230 can be useful for adjustment of conjugates, and can also or alternatively be used as field flatteners or field lenses.

FIGS. 4A-4E include schematic diagrams of zoom relay system 200 in various operational configurations, according to some exemplary embodiments. The relay length in the illustrative embodiments in FIGS. 4A-4E is equal to 90 mm, although optical layouts can be scaled up or down. Referring to FIG. 4A, system 200 is configured to provide demagnification of object 212 at image plane 214. As illustrated, varifocal lens group 218 is positioned along optical axis 216 to provide the desired magnification (demagnification), i.e., zoom. As also shown, lens plates 222, 224 of varifocal freeform lens 226 are displaced appropriately relative to each other in the dimension transverse to optical axis 216 to compensate for movement of the image from image plane 214, such that the image does not move from image plane 214. Hence, according to the exemplary embodiments, the relay length does not change with magnification.

Referring to FIG. 4B, system 200 is configured to provide demagnification of object 212 at image plane 214. As illustrated, varifocal lens group 218 is positioned along optical axis 216 to provide the desired magnification (demagnification), i.e., zoom. As also shown, lens plates 222, 224 of varifocal freeform lens 226 are displaced appropriately relative to each other in the dimension transverse to optical axis 216 to compensate for movement of the image from image plane 214, such that the image does not move from image plane 214. Hence, according to the exemplary embodiments, the relay length does not change with magnification.

Referring to FIG. 4C, system 200 is configured to provide 1:1 magnification of object 212 at image plane 214. As illustrated, varifocal lens group 218 is positioned along optical axis 216 to provide the desired magnification, i.e., zoom. As also shown, lens plates 222, 224 of varifocal freeform lens 226 are displaced appropriately relative to each other in the dimension transverse to optical axis 216 to compensate for movement of the image from image plane 214, such that the image does not move from image plane 214. Hence, according to the exemplary embodiments, the relay length does not change with magnification.

Referring to FIG. 4D, system 200 is configured to provide magnification of object 212 at image plane 214. As illustrated, varifocal lens group 218 is positioned along optical axis 216 to provide the desired magnification, i.e., zoom. As also shown, lens plates 222, 224 of varifocal freeform lens 226 are displaced appropriately relative to each other in the dimension transverse to optical axis 216 to compensate for movement of the image from image plane 214, such that the image does not move from image plane 214. Hence, according to the exemplary embodiments, the relay length does not change with magnification.

Referring to FIG. 4E, system 200 is configured to provide magnification of object 212 at image plane 214. As illustrated, varifocal lens group 218 is positioned along optical axis 216 to provide the desired magnification, i.e., zoom. As also shown, lens plates 222, 224 of varifocal freeform lens 226 are displaced appropriately relative to each other in the dimension transverse to optical axis 216 to compensate for movement of the image from image plane 214, such that the image does not move from image plane 214. Hence, according to the exemplary embodiments, the relay length does not change with magnification.

Hence, the technology of the present disclosure provides a zoom relay of minimum length, which uses a single varifocal lens group that moves axially between a fixed object and a fixed image plane. The technology adds a varifocality feature to symmetric 4f relay setup in which only a single lens group moves axially. The object-to-image distance is approximately equal to 4f, where f is the focal length of the varifocal lens group in the middle position between object and image. As described above in detail, the varifocal lens group can be split into at least one conventional lens subgroup and a single varifocal lens, which in some embodiments is a tunable solid-state freeform lens. In some exemplary embodiments, two approximately symmetrical stationary lens subgroups 222, 224 are used, with the single varifocal lens group 226 disposed between them and with aperture stop (or pupil) in proximity to the varifocal lens group 226.

The zoom relay system with varifocal freeform lens can be implemented in optical systems such as a telescopic sight in a firearm (rifle scope), telescope, a microscope, a cell phone, medical imaging device, and other similar systems Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A zoom relay system, comprising:
   an optical element for receiving light from an object, the zoom relay system being adapted to generate an image of the object on an image plane; and
   a single varifocal lens group positioned along an optical axis, the single varifocal lens group comprising a first lens subgroup, a second lens subgroup and a single varifocal freeform lens between the first lens subgroup and the second lens subgroup along the optical axis, the single varifocal freeform lens comprising two lens plates, the lens plates being configured to be disposed along a dimension transverse to the optical axis, such that, when the single varifocal lens group is moved along the optical axis to adjust the magnification, the lens plates of the single varifocal freeform lens are displaced in the transverse dimension relative to each other to provide compensation, such that, when the magnification is changed, a distance between the object and the image plane remains constant; wherein the first lens subgroup, the second lens subgroup, and the single varifocal freeform lens are stationary with respect to each other as the single varifocal lens group is moved along the optical axis to adjust the magnification.

2. The zoom relay system of claim 1, wherein at least one of the first lens subgroup and the second lens subgroup provides magnification.

3. The zoom relay system of claim 2, wherein at least one of the first lens subgroup and the second lens subgroup is the optical element for receiving the light from the object.

4. The zoom relay system of claim 1, further comprising a front lens group disposed along the optical axis between the object and the varifocal lens group.

5. The zoom relay system of claim 4, wherein the front lens group is the optical element for receiving the light from the object.

6. The zoom relay system of claim 1, further comprising a back lens group disposed along the optical axis between the single varifocal lens group and the image plane.

7. A method for operating a zoom relay system, comprising:
   receiving light from an object to an optical element;
   generating an image of the object on an image plane; and
   positioning a single varifocal lens group along an optical axis, the single varifocal lens group comprising a first lens subgroup, a second lens subgroup and a single varifocal freeform lens between the first lens subgroup and the second lens subgroup along the optical axis, the single varifocal freeform lens comprising two lens plates, the lens plates being configured to be disposed along a dimension transverse to the optical axis, such that, when the single varifocal lens group is moved along the optical axis to adjust the magnification, the lens plates of the single varifocal freeform lens are displaced in the transverse dimension relative to each other to provide compensation, such that, when the magnification is changed, a distance between the object and the image plane remains constant; wherein the first lens subgroup, the second lens subgroup, and the single varifocal freeform lens are stationary with respect to each other as the single varifocal lens group is moved along the optical axis to adjust the magnification.

8. The method of claim 7, wherein at least one of the first lens subgroup and the second lens subgroup provides magnification.

9. The method of claim 8, wherein at least one of the first lens subgroup and the second lens subgroup is the optical element for receiving the light from the object.

10. The method of claim 7, further comprising a front lens group disposed along the optical axis between the object and the varifocal lens group.

11. The method of claim 10, wherein the front lens group is the optical element for receiving the light from the object.

12. The method of claim 7, further comprising a back lens group disposed along the optical axis between the single varifocal lens group and the image plane.

* * * * *